March 2, 1971  L. BERTELE  3,567,310
WIDE ANGLE LENS

Filed July 31, 1967  2 Sheets-Sheet 1

Inventor:
Ludwig Bertele
BY Baldwin Wight Diller & Brown
Attorneys

United States Patent Office 3,567,310
Patented Mar. 2, 1971

3,567,310
WIDE ANGLE LENS
Ludwig Bertele, Heerbrugg, Saint Gall, Switzerland
Filed July 31, 1967, Ser. No. 657,374
Claims priority, application Switzerland, Aug. 2, 1966,
11,226/66
Int. Cl. G02b 9/60, 9/62
U.S. Cl. 350—176
9 Claims

ABSTRACT OF THE DISCLOSURE

A wide angle objective lens having at least five lens members separated by air spaces, of which two converging lens members, separated by a diaphragm space, are followed on the object side by at least two diverging lens members, and on the image side by at least one diverging lens member, in which the axial air space between the converging lens member on the object side and the preceded diverging meniscus lies between 0.002 F and 0.050 F, and in which the numerical value of the product of the ratio of the difference between the radii of curvature of the bounding surfaces of the said air space to the length of the air space, and the ratio of the radius of curvature of the inner of said bounding surfaces to the radius of curvature of the convex surface of the pair of surfaces concave towards the diaphragm in the converging lens member on the image side, lies between 1.60 and 3.9.

This invention relates to a wide angle objective lens having at least five lens members separated by air spaces.

In British patent specification No. 719,162 there are described lenses having angular fields of 90° and 100° and an aperture ratio of $f$ 4.5; such lenses have been known under the name of Biogon. Efforts to increase the aperture still further resulted in an increase of the zonal aberration to an intolerable extent, unless the length of the lens was increased very considerably which was undesirable.

The present invention seeks to provide a desirably short lens having the aforesaid wide angular field, and an aperture ratio of $f$ 2.8 or more with tolerable zonal aberration.

The invention also seeks to provide lenses of apertures smaller than $f$ 2.8 having less zonal aberration than do similar known lenses of the same aperture.

Figure 1:
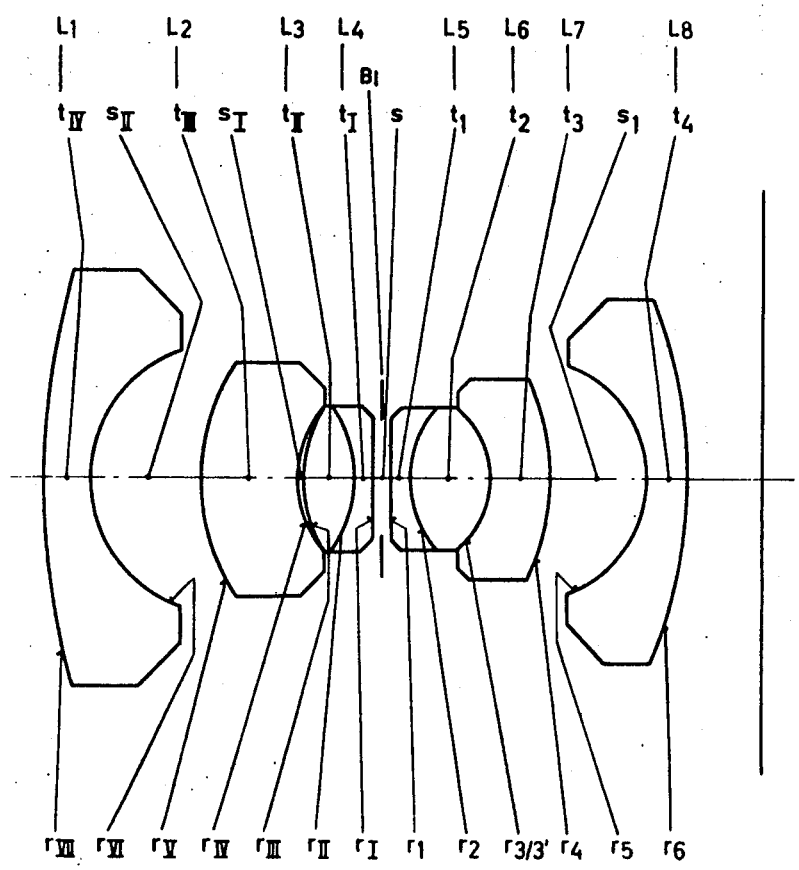
Figure 2:
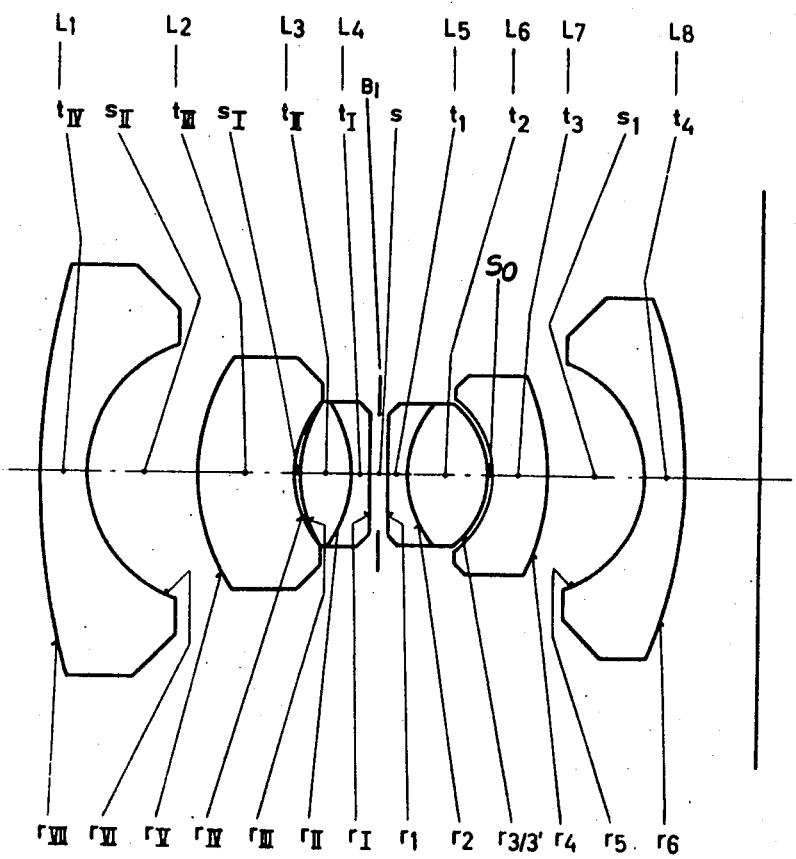

FIG. 1 is a diagrammatic view of a lens according to one embodiment of the invention; and FIG. 2 is a similar view of a modified embodiment.

The present invention provides a wide angle lens of total focal length F, divided into object-side and image-side groups of elements by a diaphragm, wherein each group has a converging member having, adjacent the diaphragm, an inner negative lens element $L_4$, $L_5$ with a concave surface remote from the diaphragm and cemented to an adjacent inner convex surface of a positive lens element $L_3$, $L_6$ having a higher refractive index than the negative lens element $L_6$, the outer convex surface of the positive lens element of the converging member of the image-side group having a radius of curvature $r_3$ and a centre of curvature lying on the image side of the outer convex surface of the positive lens element $L_3$ of the object-side group converging member, the converging member of the image-side group including a diverging element $L_7$ having a surface concave towards the diaphragm and spaced from or cemented to the outer convex surface of the positive lens element $L_6$; the image-side group having, between the converging member and the image, at least one diverging member $L_8$ spaced from the converging member; the object-side group having, between the converging member and the object, at least two diverging members $L_1$ and $L_2$ separated from each other by a distance $s_{II}$ and from the converging member by an air space, the diverging member $L_2$ next to the converging member being a meniscus concave towards the diaphragm with a radius $r_{IV}$ and spaced a distance $s_I$ from the adjacent outer surface, of radius $r_{III}$, of the positive lens element $L_3$, the distance $s_I$ being between 0.002 F and 0.050 F; the lengths of the said radii $r_{III}$, $r_{IV}$, $r_3$, and distance $s_I$, being such as to satisfy the relationship $$1.6 < \frac{r_{III} - r_{IV}}{s_I} \cdot \frac{r_{III}}{-r_3} < 3.9$$

I have found that, if the meniscus diverging member next to the converging member of the object-side group is brought so close to the coverging member that its distance from the latter is within the above stated limits 0.050 F to 0.002 F, and if at the same time the mutually facing lens surfaces are curved more sharply than has hitherto been the case, then a large angle of refraction is obtained. This measure, in conjunction with the pair of surfaces, which are concave towards the diaphragm, in the converging member of the image-side group, has such favourable influence on the shape of the spherical aberration curve that an aperture ratio of $f$ 2.8 or even more can be achieved. The sharp curvature of the mutually facing lens surfaces is achieved when the aforesaid relationship is satisfied, while the aforesaid spacing limits ensure a satisfactory optical path in the extended equatorial section.

The partial focal length after the converging lens member on the image side, that is to say without the diverging meniscus on the image side, having regard to the large aperture ratio, should preferably amount to from 0.65 to 0.85 times the total focal length F.

The cemented surface ($r_6$), which is concave in the direction of the diaphragm, in the converging member on the object side in the examples of British Pat. No. 719,162 is thus superfluous since its function is taken over by the air space having the bounding surfaces of radii $r_{III}$ and $r_{IV}$.

The following examples of embodiment will be described with reference to the drawing. The radii, thicknesses, air spaces, and individual lens element show the index in Roman figures in the group on the object side and with Arabic numerals in the group on the image side, in both cases increasing from the diaphragm. Linear dimensions are in millimetres. B1 indicates the diaphragm and $s$ is the diaphragm space. If an adjustable diaphragm aperture and a shutter diaphragm are dispensed with, the diaphragm space may become zero. In this case the two converging members may be combined to form a single member with a diaphragm incision. In Examples 1 to 4 the radii $r_3$ and $r_3'$ are equal and the surfaces are cemented together, while in Example 5 the two surfaces $r_3$ and $r_3'$ are not cemented and are separated by a small air space $s_0$.

| Example: | $\dfrac{r_{III}-r_{IV}}{s_I} \cdot \dfrac{r_{III}}{-r_3}$ | Partial focal length after $L^I$, F |
|---|---|---|
| (1) 0.022 F | 2.251 | 0.73 |
| (2) 0.0136 F | 2.557 | 0.74 |
| (3) 0.0038 F | 2.977 | 0.75 |
| (4) 0.004 F | 3.68 | 0.77 |
| (5) 0.0304 F | 1.61 | 0.71 |

The pair of surfaces $r_3/r_3'$, which are concave towards the diaphragm and are situated in the converging lens member on the image side, may be cemented or be left uncemented with a small air space between them.

It is within the scope of the invention for the outer meniscus $L_1$ disposed on the object side to be in the form of a cemented element or to be split up into two individual lens elements. The same applies also to the outer meniscus $L_8$ disposed on the image side. For the purpose of further improvements of the correction, cemented surfaces may additionally be inserted in other lens elements.

The following numerical table now shows the optical data of five lenses having an aperture of $f$ 2.8, with an angular field of about 90° and a focal length of $F=100$ mm. Lenses according to Examples 1 to 4 are illustrated in the accompanying FIG. 1, while a lens according to Example 5 is illustrated in the accompanying FIG. 2.

EXAMPLE 1

| | | | $n_d$ | $\nu$ |
|---|---|---|---|---|
| $L_1$ | $r_{VII}=+270.7$ | $t_{IV}=17.0$ | 1.49388 | 66.1 |
|  | $r_{VI}=+47.95$ | $s_{II}=38.55$ | | |
|  | $r_V=+68.0$ | $t_{III}=36.28$ | 1.72340 | 38.0 |
| $L_2$ | $r_{IV}=+39.72$ | $s_I=2.20$ | | |
|  | $r_{III}=+43.14$ | $t_{II}=16.9$ | 1.67790 | 55.5 |
| $L_3$ | $r_{II}=-45.35$ | $t_I=6.8$ | 1.57501 | 41.3 |
| $L_4$ | $r_1=-792.8$ | $s=6.0$ | | |
|  | $r_1=+1,225.0$ | $t_1=8.3$ | 1.52015 | 63.6 |
| $L_5$ | $r_2=+35.85$ | $t_2=29.2$ | 1.62041 | 60.3 |
| $L_6$ | $r_3=-29.79$ | $t_3=20.4$ | 1.80802 | 40.7 |
| $L_7$ | $r_4=-74.73$ | $s_1=34.5$ | | |
|  | $r_5=-42.06$ | $t_4=14.0$ | 1.50463 | 67.6 |
| $L_8$ | $r_6=-176.7$ | | | |
|  | $s_0'=28.9$ | | | |

EXAMPLE 2

| | | | $n_d$ | $\nu$ |
|---|---|---|---|---|
| $L_1$ | $r_{VII}=+274.4$ | $t_{IV}=17.0$ | 1.49388 | 66.1 |
|  | $r_{VI}=+47.69$ | $s_{II}=36.3$ | | |
|  | $r_V=+68.03$ | $t_{III}=37.4$ | 1.78179 | 37.1 |
| $L_2$ | $r_{IV}=+38.70$ | $s_I=1.36$ | | |
|  | $r_{III}=+41.13$ | $t_{II}=16.9$ | 1.67790 | 55.5 |
| $L_3$ | $r_{II}=-44.22$ | $t_I=6.8$ | 1.58050 | 40.8 |
| $L_4$ | $r_1=-946.6$ | $s=6.24$ | | |
|  | $r_1=+1,190.0$ | $t_1=7.05$ | 1.58913 | 61.2 |
| $L_5$ | $r_2=+35.94$ | $t_2=30.05$ | 1.69680 | 55.6 |
| $L_6$ | $r_3=-28.73$ | $t_3=21.32$ | 1.80802 | 40.7 |
| $L_7$ | $r_4=-87.49$ | $s_1=34.0$ | | |
|  | $r_5=-41.90$ | $t_4=14.2$ | 1.51112 | 50.5 |
| $L_8$ | $r_6=-167.76$ | | | |
|  | $s_0'=27.6$ | | | |

EXAMPLE 3

| | | | $n_d$ | $\nu$ |
|---|---|---|---|---|
| $L_1$ | $r_{VII}=+280.0$ | $t_{IV}=14.0$ | 1.48749 | 70.0 |
|  | $r_{VI}=+47.45$ | $s_{II}=38.55$ | | |
|  | $r_V=+69.0$ | $t_{III}=35.15$ | 1.83500 | 37.2 |
| $L_2$ | $r_{IV}=+36.02$ | $s_I=0.38$ | | |
|  | $r_{III}=+36.908$ | $t_{II}=20.06$ | 1.67790 | 55.5 |
| $L_3$ |  | | | |
| $L_4$ | $r_{II}=-42.70$ | $t_I=5.90$ | 1.58775 | 42.0 |
|  | $r_1=-900.0$ | $s=6.24$ | | |
|  | $r_1=+797.4$ | $t_1=6.7$ | 1.56384 | 60.8 |
| $L_5$ | $r_2=+36.0$ | $t_2=28.4$ | 1.65160 | 58.5 |
| $L_6$ | $r_3=-28.97$ | $t_3=17.6$ | 1.72000 | 43.8 |
| $L_7$ | $r_4=-87.85$ | $s_1=37.0$ | | |
|  | $r_5=-41.75$ | $t_4=9.3$ | 1.51009 | 63.4 |
| $L_8$ | $r_6=-149.34$ | | | |
|  | $s_0'=31.1$ | | | |

EXAMPLE 4

| | | | $n_d$ | $\nu$ |
|---|---|---|---|---|
| $L_1$ | $r_{VII}=+287.40$ | $t_{IV}=14.90$ | 1.48749 | 70.0 |
|  | $r_{VI}=+50.52$ | $s_{II}=41.04$ | | |
|  | $r_V=+73.46$ | $t_{III}=37.42$ | 1.83500 | 37.2 |
| $L_2$ | $r_{IV}=+38.35$ | $s_I=0.40$ | | |
|  | $r_{III}=+39.35$ | $t_{II}=21.35$ | 1.69100 | 54.7 |
| $L_3$ |  | | | |
| $L_4$ | $r_{II}=-45.46$ | $t_I=6.28$ | 1.50150 | 40.4 |
|  | $r_1=-1,288.00$ | $s=6.64$ | | |
|  | $r_1=+1,021.90$ | $t_1=7.13$ | 1.58913 | 61.3 |
| $L_5$ | $r_2=+38.31$ | $t_2=26.61$ | 1.67790 | 55.2 |
| $L_6$ | $r_3=-26.72$ | $t_3=22.36$ | 1.72000 | 43.8 |
| $L_7$ | $r_4=-96.13$ | $s_1=39.39$ | | |
|  | $r_5=-44.45$ | $t_4=9.90$ | 1.51112 | 60.4 |
| $L_8$ | $r_6=-161.70$ | | | |
|  | $s_0'=27.56$ | | | |

EXAMPLE 5

| | | | $n_d$ | $\nu$ |
|---|---|---|---|---|
| $L_1$ | $r_{VII}=+267.00$ | $t_{IV}=17.00$ | 1.49388 | 66.1 |
|  | $r_{VI}=+48.21$ | $s_{II}=40.80$ | | |
|  | $r_V=+67.64$ | $t_{III}=35.16$ | 1.66998 | 39.2 |
| $L_2$ | $r_{IV}=+40.75$ | $s_I=3.04$ | | |
|  | $r_{III}=+45.25$ | | | |
| $L_3$ | $r_{II}=-48.00$ | $t_{II}=16.90$ | 1.67790 | 55.5 |
| $L_4$ | $r_1=-715.00$ | $t_I=6.80$ | 1.56138 | 45.3 |
|  | $r_1=+893.84$ | $s=5.76$ | | |
| $L_5$ | $r_2=+34.85$ | $t_1=9.55$ | 1.47069 | 67.3 |
| $L_6$ | $r_3=-41.50$ | $t_2=27.00$ | 1.55753 | 67.3 |
|  | $r_3'=-36.87$ | $s_0=0.70$ | | |
| $L_7$ | $r_4=-63.54$ | $t_3=24.10$ | 1.85000 | 29.0 |
|  | $r_5=-42.55$ | $s_1=32.00$ | | |
| $L_8$ | $r_6=-199.70$ | $t_4=12.50$ | 1.51823 | 59.0 |
|  | $s_0'=32.71$ | | | |

What is claimed is:
1. A wide angle lens of total focal length F, comprising a diaphragm and at least five lens members, the diaphragm and the lens members being co-axially mounted so as to form object-side and image-side groups of lens members disposed on respective sides of the diaphragm; each group having a converging member comprising an inner negative lens element mounted adjacent the diaphragm and having a concave surface remote from the diaphragm, and a positive lens element having an inner and an outer convex surface and a higher refractive index than the negative lens element, the said concave surface of the negative lens element being cemented to the adjacent inner convex surface of the positive element, the outer convex surface of the positive lens element of the converging member of the image-side group having a radius of curvature $r_3$ and a centre of curvature lying on the image side of the outer convex surface of the positive lens element of the object-side group converging member, the converging member of the image-side group also including a diverging element having a surface concave towards the diaphragm and adjacent the outer convex surface of the positive lens element; the image-side group additionally having at least one divergent member mounted on the image-side of the converging member and spaced therefrom; the object-side group additionally having at least two diverging members mounted on the object side of the converging member and spaced therefrom and from each other, the diverging member next to the converging member being a meniscus concave towards the diaphragm with a radius $r_{IV}$ and spaced a distance $s_I$ from the adjacent outer surface, of radius $r_{III}$, of the positive lens element, the distance $s_I$ being between 0.002 F and 0.050 F; the lengths of the said radii $r_{III}$, $r_{IV}$ and $r_3$, and distance $s_I$ being such as to satisfy the relationship $$1.60 < \frac{r_{III} - r_{IV}}{s_I} \cdot \frac{r_{III}}{-r_3} < 3.9$$

2. A lens as claimed in claim 1 in which the concave surface of the diverging element included in the converging member of the image-side group is cemented to the outer convex surface of the positive lens element.

3. A lens as claimed in claim 1 wherein the converging members are separated by a space containing the diaphragm.

4. A lens as claimed in claim 1 wherein the partial focal length after the converging lens member of the image-side group is from 0.65 F to 0.85 F.

5. A wide angle lens according to claim 1 in which the values of $r_3$, $r_{IV}$, $r_{III}$ and $s_I$ are as set forth in the following table:

| | | | $n_d$ | $\nu$ |
|---|---|---|---|---|
| $L_1$ | $r_{VII}=+270.7$ | $t_{IV}=17.0$ | 1.49388 | 66.1 |
| | $r_{VI}=+47.95$ | $s_{II}=38.55$ | | |
| $L_2$ | $r_V=+68.0$ | $t_{III}=36.28$ | 1.72340 | 38.0 |
| | $r_{IV}=+39.72$ | $s_I=2.20$ | | |
| $L_3$ | $r_{III}=+43.14$ | $t_{II}=16.9$ | 1.67790 | 55.5 |
| | $r_{II}=-45.35$ | $t_I=6.8$ | 1.57501 | 41.3 |
| $L_4$ | $r_I=-792.8$ | $s=6.0$ | | |
| $L_5$ | $r_1=+1,225.0$ | $t_1=8.3$ | 1.52015 | 63.6 |
| | $r_2=+35.85$ | $t_2=29.2$ | 1.62041 | 60.3 |
| $L_6$ | $r_3=-29.79$ | $t_3=20.4$ | 1.80802 | 40.7 |
| $L_7$ | $r_4=-74.73$ | $s_1=34.5$ | | |
| | $r_5=-42.06$ | $t_4=14.0$ | 1.50463 | 64.7 |
| $L_8$ | $r_6=-176.7$ | | | |
| | $s_0'=28.9$ | | | |

6. A wide angle lens according to claim 1 in which the values of $r_3$, $r_{IV}$, $r_{III}$ and $s_I$ are as set forth in the following table:

| | | | $n_d$ | $\nu$ |
|---|---|---|---|---|
| $L_1$ | $r_{VII}=+274.4$ | $t_{IV}=17.0$ | 1.49388 | 66.1 |
| | $r_{VI}=+47.69$ | $s_{II}=36.3$ | | |
| $L_2$ | $r_V=+68.03$ | $t_{III}=37.4$ | 1.78179 | 37.1 |
| | $r_{IV}=+38.70$ | $s_I=1.36$ | | |
| $L_3$ | $r_{III}=+41.13$ | $t_{II}=16.9$ | 1.67790 | 55.5 |
| | $r_{II}=-44.22$ | $t_I=6.8$ | 1.58050 | 40.8 |
| $L_4$ | $r_I=-946.6$ | $s=6.24$ | | |
| $L_5$ | $r_1=+1,190.0$ | $t_1=7.05$ | 1.58913 | 61.2 |
| | $r_2=+35.94$ | $t_2=30.05$ | 1.69680 | 55.6 |
| $L_6$ | $r_3=-28.73$ | $t_3=21.32$ | 1.80802 | 40.7 |
| $L_7$ | $r_4=-87.49$ | $s_1=34.0$ | | |
| | $r_5=-41.90$ | $t_4=14.2$ | 1.51112 | 50.5 |
| $L_8$ | $r_6=-167.76$ | | | |
| | $s_0'=27.6$ | | | |

7. A wide angle lens according to claim 1 in which the values of $r_3$, $r_{IV}$, $r_{III}$ and $s_I$ are as set forth in the following table:

| | | | $n_d$ | $\nu$ |
|---|---|---|---|---|
| $L_1$ | $r_{VII}=+280.0$ | $t_{IV}=14.0$ | 1.48749 | 70.0 |
| | $r_{VI}=+47.45$ | $s_{II}=38.55$ | | |
| $L_2$ | $r_V=+69.0$ | $t_{III}=35.15$ | 1.83500 | 37.2 |
| | $r_{IV}=+36.02$ | $s_I=0.38$ | | |
| $L_3$ | $r_{III}=+36.908$ | $t_{II}=20.06$ | 1.67790 | 55.5 |
| | $r_{II}=-42.70$ | $t_I=5.90$ | 1.58775 | 42.0 |
| $L_4$ | $r_I=-900.0$ | $s=6.24$ | | |
| $L_5$ | $r_1=+797.4$ | $t_1=6.7$ | 1.56384 | 60.8 |
| | $r_2=+36.0$ | $t_2=28.4$ | 1.65160 | 58.5 |
| $L_6$ | $r_3=-28.97$ | $t_3=17.6$ | 1.72000 | 43.8 |
| $L_7$ | $r_4=-87.85$ | $s_1=37.0$ | | |
| | $r_5=-41.75$ | $t_4=9.3$ | 1.51009 | 63.4 |
| $L_8$ | $r_6=-149.34$ | | | |
| | $s_0'=31.1$ | | | |

8. A wide angle lens according to claim 1 in which the values of $r_3$, $r_{IV}$, $r_{III}$ and $s_I$ are as set forth in the following table:

| | | | $n_d$ | $\nu$ |
|---|---|---|---|---|
| $L_1$ | $r_{VII}=+287.40$ | $t_{IV}=14.90$ | 1.48749 | 70.0 |
| | $r_{VI}=+50.52$ | $s_{II}=41.04$ | | |
| $L_2$ | $r_V=+73.46$ | $t_{III}=37.42$ | 1.83500 | 37.2 |
| | $r_{IV}=+38.35$ | $s_I=0.40$ | | |
| $L_3$ | $r_{III}=+39.35$ | $t_{II}=21.35$ | 1.69100 | 54.7 |
| | $r_{II}=-45.46$ | $t_I=6.28$ | 1.50150 | 40.4 |
| $L_4$ | $r_I=-1,288.00$ | $s=6.64$ | | |
| $L_5$ | $r_1=+1,021.90$ | $t_1=7.13$ | 1.58913 | 61.3 |
| | $r_2=+38.31$ | $t_2=26.61$ | 1.67790 | 55.2 |
| $L_6$ | $r_3=-26.72$ | $t_3=22.36$ | 1.72000 | 43.8 |
| $L_7$ | $r_4=-96.13$ | $s_1=39.39$ | | |
| | $r_5=-44.45$ | $t_4=9.90$ | 1.51112 | 60.4 |
| $L_8$ | $r_6=-161.70$ | | | |
| | $s_0'=27.56$ | | | |

9. A wide angle lens according to claim 1 in which the values of $r_3$, $r_{IV}$, $r_{III}$ and $s_I$ are as set forth in the following table:

|  |  |  | $n_d$ | $\nu$ |
|---|---|---|---|---|
| $L_1$ | $r_{VII}=+267.00$ $r_{VI}=+48.21$ | $t_{IV}=17.00$ $s_{II}=40.80$ | 1.49388 | 66.1 |
| $L_2$ | $r_V=+67.64$ $r_{IV}=+40.75$ $r_{III}=+45.25$ | $t_{III}=35.16$ $s_I=3.04$ | 1.66998 | 39.2 |
| $L_3$ | $r_{II}=-48.00$ | $t_{II}=16.90$ | 1.67790 | 55.5 |
| $L_4$ | $r_I=-715.00$ | $t_I=6.80$ $s=5.76$ | 1.56138 | 45.3 |
| $L_5$ | $r_1=+893.84$ $r_2=+34.85$ | $t_1=9.55$ | 1.47069 | 67.3 |
| $L_6$ | $r_3=-41.50$ | $t_2=27.00$ $s_0=0.70$ | 1.55753 | 67.3 |
| $L_7$ | $r_3'=-36.87$ $r_4=-63.54$ | $t_3=24.10$ $s_1=32.00$ | 1.85000 | 29.0 |
| $L_8$ | $r_5=-42.55$ $r_6=-199.70$ $s_0'=-32.71$ | $t_4=12.50$ | 1.51823 | 59.0 |

References Cited

UNITED STATES PATENTS

| 2,734,424 | 2/1956 | Bertele | 350—215 |
| 3,376,091 | 4/1968 | Wagner | 350—220X |

FOREIGN PATENTS

| 392,918 | 1965 | Switzerland | 350—220 |

JOHN K. CORBIN, Primary Examiner

U.S. Cl. X.R.

350—215, 216